US012611924B2

(12) United States Patent
Ghelfi et al.

(10) Patent No.: US 12,611,924 B2
(45) Date of Patent: Apr. 28, 2026

(54) RADIATOR ARRANGEMENT FOR A VEHICLE AND VEHICLE

(71) Applicant: AUDI AG, Ingolstadt (DE)

(72) Inventors: Matteo Ghelfi, Ernsgaden (DE);
Patrick Then, Ingolstadt (DE);
Tzvetomir Tzekov, Munich (DE);
Judith Hoerstmann, Munich (DE);
Stefano Nebiolo, Asti (IT); Alessandro Longhini, Montaldo Torinese (IT);
Giovanni Audello, Turin (IT);
Giuseppe Magno, Turin (IT)

(73) Assignee: AUDI AG, Ingolstadt (DE)

( * ) Notice: Subject to any disclaimer, the term of this patent is extended or adjusted under 35 U.S.C. 154(b) by 94 days.

(21) Appl. No.: 18/689,243

(22) PCT Filed: Sep. 13, 2022

(86) PCT No.: PCT/EP2022/075422
§ 371 (c)(1),
(2) Date: Mar. 5, 2024

(87) PCT Pub. No.: WO2023/066571
PCT Pub. Date: Apr. 27, 2023

(65) Prior Publication Data
US 2024/0399855 A1 Dec. 5, 2024

(30) Foreign Application Priority Data

Oct. 19, 2021 (EP) .................................... 21203347

(51) Int. Cl.
B60K 11/08 (2006.01)
B60K 11/04 (2006.01)
(52) U.S. Cl.
CPC .............. B60K 11/08 (2013.01); B60K 11/04 (2013.01)

(58) Field of Classification Search
CPC ................................ B60K 11/08; B60K 11/04
(Continued)

(56) References Cited

U.S. PATENT DOCUMENTS

| | | | | |
|---|---|---|---|---|
| 8,505,660 B2 * | 8/2013 | Fenchak | .............. | B60K 11/085 |
| | | | | 180/68.1 |
| 8,544,581 B2 * | 10/2013 | Stokes | ................... | B60R 19/48 |
| | | | | 49/89.1 |

(Continued)

FOREIGN PATENT DOCUMENTS

| | | |
|---|---|---|
| DE | 102010038194 A1 | 4/2011 |
| DE | 202011050032 U1 | 7/2011 |

(Continued)

OTHER PUBLICATIONS

International Search Report and Written Opinion of the International Searching Authority issued on Jan. 12, 2023, in corresponding International Application No. PCT/EP2022/075422, 13 pages.

(Continued)

*Primary Examiner* — Claire E Rojohn, III
(74) *Attorney, Agent, or Firm* — Maier & Maier, PLLC

(57) ABSTRACT

A radiator arrangement for a vehicle, including a radiator and an air guiding element for guiding an airflow towards the radiator. The air guiding element has an inlet for letting in the airflow and an outlet facing the radiator. The air guiding element includes a plurality of louvers which are configured to prevent stones of a predetermined size to hit the radiator. The louvers are fixed in position relative to a housing of the air guiding element. The housing is configured to guide the airflow towards the outlet. The outlet has a cross-sectional area at least encompassing an area of a front face of the radiator, and the front face of the radiator is exposed to the airflow.

19 Claims, 3 Drawing Sheets

(58) Field of Classification Search
USPC .................................... 165/41, 42, 44, 134.1
See application file for complete search history.

(56) References Cited

U.S. PATENT DOCUMENTS

| | | | | |
|---|---|---|---|---|
| 8,631,889 | B2 * | 1/2014 | Begleiter | B60T 5/00 |
| | | | | 180/68.1 |
| 8,983,735 | B2 * | 3/2015 | Konishi | B60K 11/04 |
| | | | | 180/68.1 |
| 8,991,477 | B2 * | 3/2015 | Katoh | B60H 1/00064 |
| | | | | 165/41 |
| 9,393,861 | B2 * | 7/2016 | Hori | F01P 7/10 |
| 9,447,719 | B2 * | 9/2016 | Kiener | F28F 27/02 |
| 9,676,269 | B2 * | 6/2017 | Jeong | B60K 11/085 |
| 9,758,031 | B2 * | 9/2017 | Edwards | B60K 11/085 |
| 9,776,616 | B2 * | 10/2017 | Itoh | B60W 20/18 |
| 9,914,351 | B2 * | 3/2018 | Kim | B60K 11/085 |
| 10,029,558 | B2 * | 7/2018 | Frayer, III | B60K 11/085 |
| 10,071,625 | B1 * | 9/2018 | Stoddard | B60K 11/085 |
| 10,471,822 | B2 * | 11/2019 | Lambert | B60R 19/52 |
| 10,556,501 | B2 * | 2/2020 | Herlem | B60K 11/085 |
| 10,720,682 | B2 * | 7/2020 | Park | H01M 10/658 |
| 10,787,141 | B2 * | 9/2020 | Vacca | B60R 19/52 |
| 10,941,694 | B2 * | 3/2021 | Ritz | B60K 11/085 |
| 11,465,492 | B2 * | 10/2022 | Guyon | F01P 7/10 |
| 11,634,023 | B2 * | 4/2023 | Kim | B60K 11/085 |
| | | | | 236/35.2 |
| 12,011,967 | B2 * | 6/2024 | Garnier | B60K 11/06 |
| 12,134,313 | B2 * | 11/2024 | Bireaud | F01P 5/06 |
| 12,187,114 | B2 * | 1/2025 | Maeda | B60K 11/085 |
| 12,337,676 | B2 * | 6/2025 | Müller | F01P 7/10 |
| 12,365,236 | B2 * | 7/2025 | Rode | B60K 11/04 |
| 2002/0112494 | A1 * | 8/2002 | Harth | B60K 11/085 |
| | | | | 62/239 |
| 2010/0139583 | A1 * | 6/2010 | Klotz | B60K 11/085 |
| | | | | 123/41.04 |
| 2011/0005732 | A1 * | 1/2011 | Seto | F28F 9/0207 |
| | | | | 165/121 |
| 2011/0138850 | A1 * | 6/2011 | Suzuki | F28F 21/06 |
| | | | | 165/151 |
| 2012/0085510 | A1 * | 4/2012 | Kim | B60K 11/04 |
| | | | | 165/44 |
| 2012/0241128 | A1 * | 9/2012 | Vacca | B60K 11/085 |
| | | | | 165/44 |
| 2014/0039765 | A1 * | 2/2014 | Charnesky | B60K 11/085 |
| | | | | 701/49 |
| 2018/0370348 | A1 * | 12/2018 | Takeuchi | F01P 3/18 |
| 2019/0001809 | A1 * | 1/2019 | Fujitani | B60K 11/085 |
| 2019/0143785 | A1 * | 5/2019 | Tilbury | B60H 1/00764 |
| | | | | 165/271 |
| 2019/0193529 | A1 * | 6/2019 | Lechat | B05B 17/0615 |
| 2019/0315224 | A1 * | 10/2019 | Mitidieri | F28F 27/02 |
| 2020/0023728 | A1 * | 1/2020 | Dill | B60K 11/085 |
| 2022/0041034 | A1 * | 2/2022 | Garnier | B60K 11/085 |
| 2022/0410696 | A1 * | 12/2022 | Göbel | B60K 11/085 |
| 2024/0399855 | A1 * | 12/2024 | Ghelfi | B60K 11/04 |

FOREIGN PATENT DOCUMENTS

| | | | |
|---|---|---|---|
| EP | 2474723 | A1 | 7/2012 |
| EP | 3591328 | A1 | 1/2020 |
| FR | 3076496 | A1 | 7/2019 |
| KR | 1020150071268 | A | 6/2015 |

OTHER PUBLICATIONS

International Preliminary Report on Patentability issued on May 2, 2024, in corresponding International Application No. PCT/EP2022/075422, 8 pages.

Extended European Search Report issued on Apr. 14, 2022, in corresponding European Application No. 21203347.6, 10 pages.

* cited by examiner

RADIATOR ARRANGEMENT FOR A VEHICLE AND VEHICLE

FIELD

The invention relates to a radiator arrangement for a vehicle. The radiator arrangement comprises a radiator and an air guiding element for guiding an airflow towards the radiator. The air guiding element has an inlet for letting in the airflow and an outlet facing the radiator. The air guiding element comprises a plurality of louvers which are configured to prevent stones of a predetermined size to hit the radiator. The invention further relates to a vehicle with such a radiator arrangement.

BACKGROUND

Document DE 20 2011 050 032 U1 describes a throttle device for adjusting an airflow through an opening in a vehicle body. The throttle device comprises a frame through which the airflow is guided towards a radiator of the vehicle. The frame has longitudinal guides along which louvers can slide between an open position and a closed position. If the louvers are moved into the open position, the airflow can pass through the frame. If the louvers are moved into the closed position, the louvers prevent the air from passing through the frame. By a plurality of pivoting axes, along which adjacent louvers are coupled to each other, a stone chip protection is provided.

However, if the louvers are folded and therefore moved into the open position, the pivoting axes cannot prevent stones from passing through the frame and from potentially hitting the radiator.

Document DE 10 2010 038 194 A1 describes an adjustable guiding device for controlling external air flowing towards a radiator. The guiding device comprises an upper shutter assembly and a lower air flap. The upper shutter assembly and the lower air flap are linked by a coupling mechanism and can therefore be moved simultaneously.

Document KR 20150071268 A describes an airflow guide device for a vehicle, wherein the airflow guide device comprises an upper air flap device and a lower air flap device.

It is further possible to protect a radiator of a vehicle against damages resulting from stone chip events by providing a stone chip grill at a front face of the radiator. Such a stone chip grill, which can be made from plastic, must however be fixed to the radiator in order to protect the radiator against leakages resulting from stone chip events.

On the one hand, this is time consuming and cumbersome. Further, fixing such a stone chip protection grill on the front face of the radiator leads to an increase in the pressure loss of the airflow flowing through the radiator. The pressure loss results from the stone chip protection grill attached to the front face of the radiator. Additionally, the heat exchange performance of the radiator is reduced due to the presence of such a stone chip protection grill.

Finally, fixing the stone chip protection grill to the radiator increases a potential for leakages between the air guiding element and the radiator. This results in a lower amount of air reaching the radiator in operation of the radiator arrangement.

SUMMARY

It is an object of the present invention to indicate a radiator arrangement of the initially mentioned kind, which provides a stone chip protection in a particularly simple and reliable manner, and to provide a vehicle with such a radiator arrangement.

The inventive radiator arrangement comprises a radiator and an air guiding element for guiding an airflow towards the radiator. The air guiding element has an inlet for letting in the airflow and an outlet facing the radiator. The air guiding element comprises a plurality of louvers which are configured to prevent stones of a predetermined size to hit the radiator. The louvers are fixed in position relative to a housing of the air guiding element, wherein the housing is configured to guide the airflow towards the outlet. The outlet has a cross-sectional area at least encompassing an area of a front face of the radiator, wherein the front face of the radiator is exposed to the airflow.

As the louvers are fixed in position relative to the housing of the air guiding element and are therefore immobile, the louvers permanently prevent stones of the predetermined size to hit the radiator. This results in a particularly reliable and efficient stone chip protection. Further, as the housing of the air guiding element shields the airflow towards the environment in operation of the radiator arrangement, i.e. when the airflow actually passes through the air guiding element, the entire airflow reaching the front face of the radiator in operation of the radiator arrangement benefits from the retention of the stones, which is provided by the immobile louvers.

As the cross-sectional area of the outlet at least encompasses or at least includes the area of the radiator's front face, the front face comes to lie within the outlet, in particular centrally within the outlet, if the area of the front face of the radiator is smaller than the cross-sectional area of the outlet.

In particular, the cross-sectional area of the outlet can substantially correspond to the area of the front face of the radiator. This leads to a particularly extensive utilization of the cooling performance that can be provided by the airflow reaching the radiator.

In contrast to movable louvers such as louvers of a shutter assembly, the immobile louvers or louvers fixed in position are not configured to be moved, in particular rotated, from a first position into a second position. Rather the positions and orientations of the immobile louvers remain permanently unchanged.

Advantageously, integrating the immobile louvers into the air guiding element makes it unnecessary to provide a stone chip protection grill as a separate component. Further, the effort associated with mounting such an additional component to the radiator is avoided. This results in a simpler manufacturing of the radiator arrangement and in a cost reduction.

Additionally, the louvers which are part of the air guiding element, only lead to a very little increase of the pressure loss on the airflow side of the radiator compared to the pressure loss resulting from a separate stone chip protection grill fixed to the front face of the radiator. Still further, as there is no need for fixing a separate component such as the stone chip protection grill to the radiator, leakages between the housing of the air guiding element and the radiator front face can be reduced.

As the radiator is protected against damages resulting from stones hitting the front face of the radiator, a loss of a cooling fluid, in particular a cooling liquid, flowing through the radiator in operation of the radiator arrangement can be avoided to a particularly large extent. Therefore, the functionality of the radiator can be readily maintained.

The louvers fixed in position can also protect the radiator from damage by reducing the kinetic energy of stones reaching the front face of the radiator. As the probability is reduced that even stones smaller than the predetermined size hit the radiator with full speed, a reliable and efficient stone chip protection is provided.

In operation of the radiator arrangement, i.e. when the airflow actually flows through the housing of the air guiding element towards the front face of the radiator, a transfer of heat from the cooling fluid towards the airflow passing through the radiator (or vice versa from the airflow towards the cooling fluid) can occur. Therefore the cooling fluid can be cooled by means of the radiator.

In operation of the radiator arrangement, the airflow can preferably be effected by the movement of the vehicle equipped with the radiator arrangement and/or by means of a cooling fan which can be part of the radiator arrangement.

Preferably, the louvers are configured as plate like elements having a narrow side facing the airflow and upper and lower faces which are oriented substantially parallel to the airflow. Such a shape and orientation of the immobile or fixed louvers leads to a particularly low pressure loss during operation of the radiator arrangement, i.e. when the airflow actually passes through the air guiding element and reaches the front face of the radiator and then passes through the radiator. Consequently, providing the louvers as the plate like elements results in a particularly small pressure loss associated with the louvers.

Preferably, the louvers are made in one piece with the housing of the air guiding element. This results in a particularly good fixation of the louvers relative to the housing and in a good stability of the louvers. Further, providing the louvers does not require an additional mounting step. Rather, in manufacturing the air guiding element the louvers are directly produced as parts of the air guiding element.

It is particularly simple and inexpensive, if the louvers are made in one piece with the housing of the air guiding element by injection molding, in particular by injection molding of plastic. Further, it results in an advantageously low weight of the air guiding element, if the entire air guiding element is made from plastic. At the same time, utilizing plastic for providing the air guiding element and the louvers is particularly cost-effective and simple.

The air guiding element can be fixed to the radiator in a practically leakage-free manner. Alternatively or additionally, the air guiding element can be fixed in a practically leakage-free manner to a holding frame holding the radiator. In both cases a loss of air intended to reach the front face of the radiator in operation of the radiator arrangement is reduced to a particularly large extent. However, an absolutely leakage-free fixation of the air guiding element to the radiator and/or to the holding frame of the radiator arrangement is technically not feasible.

By providing the holding frame, it is particularly simple to include at least one further component into the radiator arrangement such as another heat exchanger in addition to the radiator, for example a condenser of an air conditioning system of the vehicle.

The louvers can extend in a width direction of the inlet. This can contribute to a simplified manufacturability of the louvers.

Alternatively or additionally, the louvers can extend in a height direction of the inlet. In particular, if the height of the inlet is smaller than the width of the inlet, this results in a shorter length of the louvers. This increases the stability of the louvers.

When the radiator arrangement is installed in the vehicle, the width direction of the inlet can in particular be substantially parallel to a transverse axis of the vehicle, wherein the height direction of the inlet can in particular be substantially parallel to a vertical axis of the vehicle.

The air guiding element can comprise a center strut dividing the inlet into a first inlet portion and a second inlet portion. Herein, a first group of louvers is arranged within the first inlet portion, and a second group of louvers is arranged within the second inlet portion. This results in a shorter length of each one of the louvers within the respective group compared to an air guiding element without such a center strut. Consequently, the stability of the louvers is increased.

Preferably, the first group of louvers and the second group of louvers each comprise at least one stabilizing rib extending in a first direction which is different from a second direction in which the louvers of the respective group extend. Herein, the at least one stabilizing rib has end portions abutting a frame element of the inlet. Such stabilizing ribs are beneficial for reliably holding the fixed or immobile louvers in place. Further, the at least one stabilizing rib, which is preferably narrow in a direction perpendicular to the airflow, contributes in preventing the stones from hitting the radiator. This increases the efficiency of the stone chip protection provided by the louvers.

In particular, if one of the stabilizing ribs is located in a central position with respect to the second direction, the stabilizing effect of the at least one rib is specifically high.

Preferably, a cross-sectional area of the inlet is smaller than the cross-sectional area of the outlet. This results in the fact that even a radiator having a relatively large front face does not require a similarly large inlet of the air guiding element. Consequently, the inlet of the air guiding element does not require much space, for example in a front-end portion of the vehicle. Nevertheless, an efficient heat transfer from the cooling fluid, in particular from the cooling liquid, flowing through the radiator during operation of the radiator can be achieved.

Preferably, the radiator arrangement comprises a shutter assembly arranged at the air guiding element. Herein, the shutter assembly comprises a plurality of louvers which are movable with respect to a frame structure of the shutter assembly. By means of such a shutter assembly, a quantity of air passing through the air guiding element towards the front face of the radiator can be adjusted. In particular by moving the louvers of the shutter assembly into a closed position, it can be avoided that an airflow gets to the front face of the radiator. Such an operational mode of the radiator arrangement can be advantageous for reducing the drag or air resistance of the radiator arrangement. This can be particularly beneficial, for example, if the radiator arrangement is located in a front-end portion of the vehicle equipped with the radiator arrangement.

Additionally, the movable louvers of the shutter assembly can contribute to the stone chip protection provided by the immobile louvers, i.e. the louvers which are fixed in position relative to the housing of the air guiding element. Consequently, providing the shutter assembly is helpful in preventing stones from getting to or hitting the front face of the radiator.

However, even if the radiator arrangement does not comprise the shutter element, a good protection of the radiator can be achieved, for example, by increasing the number of immobile or fixed louvers compared to a radiator arrangement having the shutter assembly.

Preferably, the shutter assembly is arranged at the inlet of the air guiding element. Such a configuration prevents the airflow from entering the air guiding element, if the movable louvers of the shutter assembly are moved into the closed position. This is beneficial, in particular with respect to the aerodynamic properties of the vehicle equipped with the radiator arrangement, i.e. in which the radiator arrangement is installed.

Preferably, the movable louvers of the shutter assembly substantially extend in the same direction as the louvers fixed in position relative to the housing of the air guiding element. Such an arrangement of the louvers is particularly helpful with respect to minimizing the pressure loss associated with the movable louvers and the immobile louvers.

Preferably, when the movable louvers of the shutter assembly are moved into an open position allowing a maximum airflow to pass through the shutter assembly, at least some of the louvers fixed in position relative to the housing of the air guiding element are in alignment with a space between two adjacent movable louvers. By such an arrangement of the fixed or immobile louvers relative to the movable louvers in alignment with the spaces or gaps between the movable louvers a protection even against relatively small stones can be provided particularly easily. Nevertheless, the pressure drop associated with the fixed louvers is low due to the orientation and shape of the fixed or immobile louvers.

Preferably, with respect to the airflow the movable louvers of the shutter assembly are arranged upstream of the louvers fixed in position relative to the housing of the air guiding element. Therefore, by closing the shutter assembly, i.e. by moving the movable louvers into the closed position, it can readily be prevented that stones get into contact with the immobile louvers or louvers fixed in position.

Preferably, the louvers are configured to prevent stones having a size of at least 15 mm to get to or hit the radiator. Therefore, such relatively large stones, which could otherwise easily damage the radiator, are prevented from getting in contact with the radiator.

Such a configuration or arrangement of the louvers can also help to reduce the probability that smaller stones, for example stones having a size or diameter of about 9 mm or of about 6 mm, hit the radiator with high speed. If the louvers reduce the kinetic energy of such smaller stones getting to the radiator, a reliable protection of the radiator from being damaged is achieved.

The protection can be provided by the immobile or fixed louvers alone or by the fixed or immobile louvers together with the movable louvers of the shutter assembly, if the radiator arrangement comprises the shutter assembly.

The louvers can, in particular, be configured to prevent stones having a size of at least 12 mm to hit the radiator. By retaining even such rather small stones, which can more readily reach the inlet of the air guiding element during operation of the vehicle equipped with the radiator arrangement than larger stones, a particularly good protection of the radiator is achieved.

Further, such an arrangement or configuration of the louvers can efficiently reduce the kinetic energy of even smaller stones. Therefore such smaller stones reach the front face of the radiator with significantly reduced speed, and damage of the radiator resulting from the smaller stones getting to the front face of the radiator is readily prevented.

Preferably, the radiator is inclined with respect to a plane determined by a height direction and a width direction of the inlet. Herein, a lower edge of the radiator in the height direction is closer to the inlet than an upper edge of the radiator. Such an inclined arrangement of the radiator has the advantage that the radiator occupies less space in the height direction than a radiator of the same size, which is arranged perpendicular to a horizontal plane.

Further, by such an inclination of the radiator, a space above the housing element and in particular above the inlet can be readily used for other purposes. For example, in the vehicle equipped with the radiator arrangement, such a space can be utilized as storing space for storing items of passengers of the vehicle.

The above advantages related to the inclination of the radiator are in particular present, if the radiator is inclined at an angle of about 45° with respect to the plane determined by the height direction and the width direction of the inlet.

The vehicle according to the invention comprises a radiator arrangement according to the invention. Preferably, the radiator arrangement is located in a front-end portion of the vehicle. This allows for a particularly easy entry of air through the inlet into the air guiding element, as the vehicle moves in a forward direction.

In particular, the radiator arrangement can be located behind a decorative grill of the vehicle, wherein the decorative grill is arranged at the front-end portion of the vehicle. In such an arrangement, the decorative grill of the vehicle further contributes to preventing the stones from hitting the radiator during a ride of the vehicle. However, even if no such decorative grill is present, the louvers which are fixed in position or immobile louvers fulfil their function of preventing the stones from getting to or hitting the radiator.

The advantages and preferred embodiments described with respect to the radiator arrangement according to the invention also apply to the vehicle according to the invention and vice versa.

The invention therefore also comprises embodiments of the inventive vehicle that comprise features that correspond to features as they have already been described in connection with the embodiments of the inventive radiator arrangement. For this reason, the corresponding features of the embodiments of the inventive vehicle are not described here again.

The inventive vehicle is preferably designed as a motor vehicle, in particular as a passenger vehicle or a truck, or as a bus.

The invention also comprises the combinations of the features of the different embodiments.

BRIEF DESCRIPTION OF THE FIGURES

In the following an exemplary implementation of the invention is described. Herein show.

DETAILED DESCRIPTION

The embodiments explained in the following are preferred embodiments of the invention. However, in the embodiments, the described components of the embodiments each represent individual features of the invention which are to be considered independently of each other and which each develop the invention also independently of each other and thereby are also to be regarded as a component of the invention in individual manner or in another than the shown combination. Furthermore, the described embodiments can also be supplemented by further features of the invention already described.

In the figures identical reference signs indicate elements that provide the same function.

Figures 1, 2:
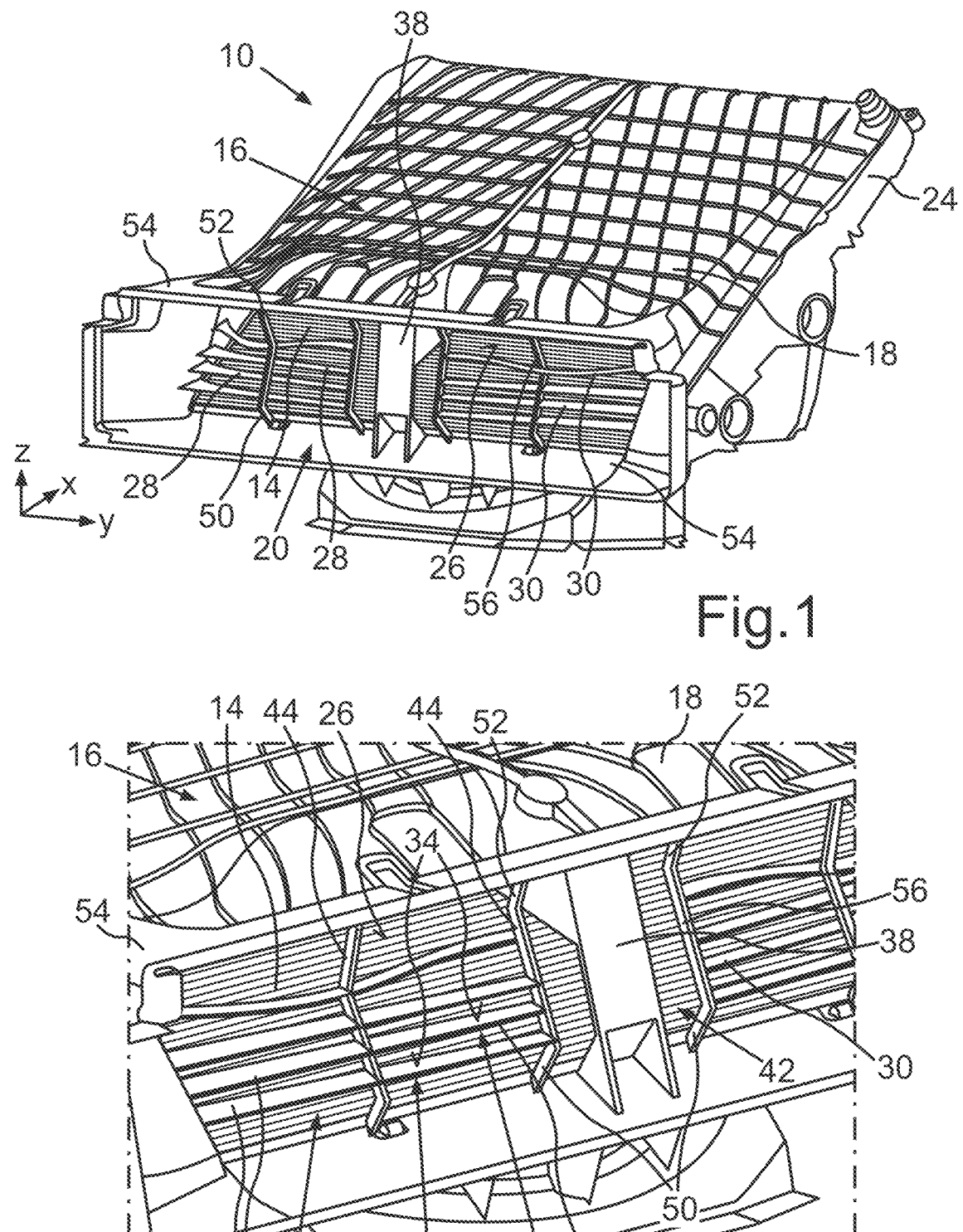
FIG. 1 in a perspective view a radiator arrangement for a vehicle, wherein the radiator arrangement comprises a radiator and an air guiding element.
FIG. 2 in a further perspective and enlarged view a part of an inlet of the air guiding element.
Figure 5:
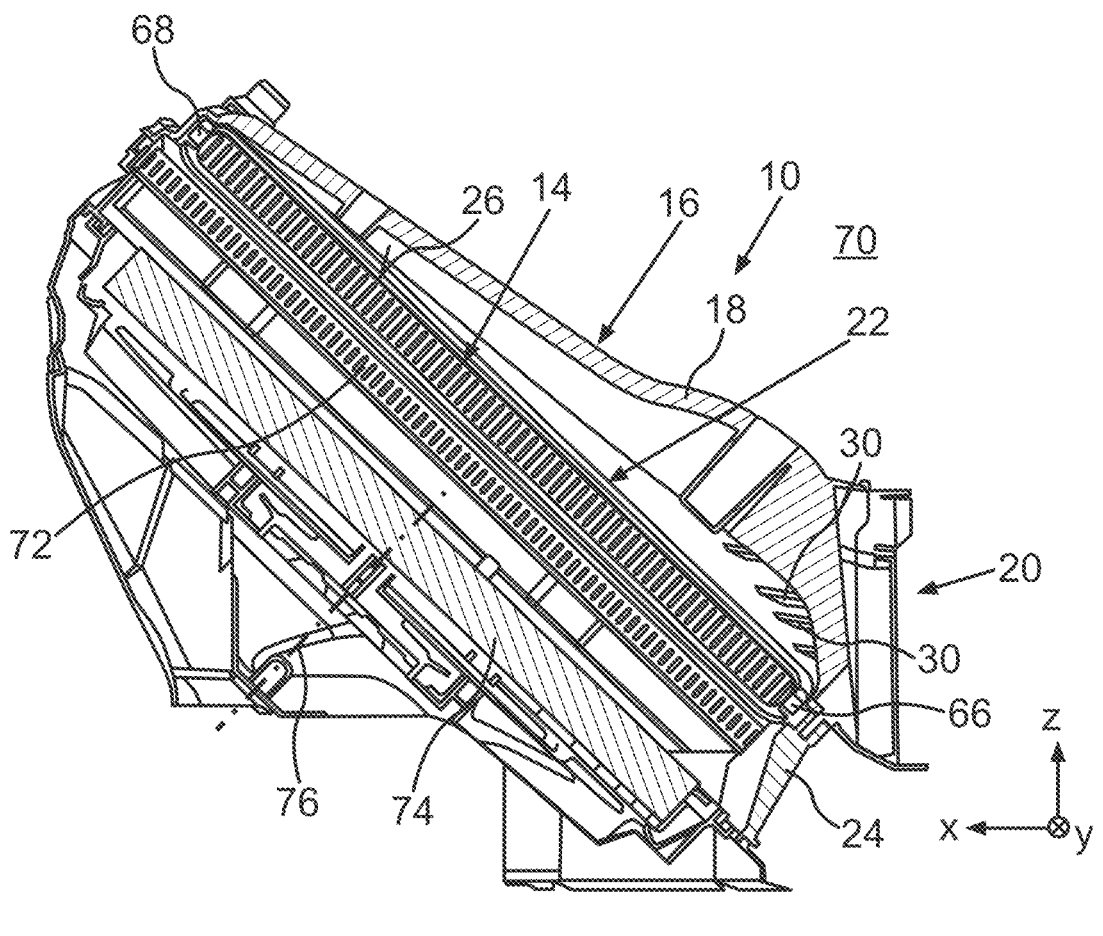
FIG. 5 a section view of the radiator arrangement shown in FIG. 1.
Figure 6:
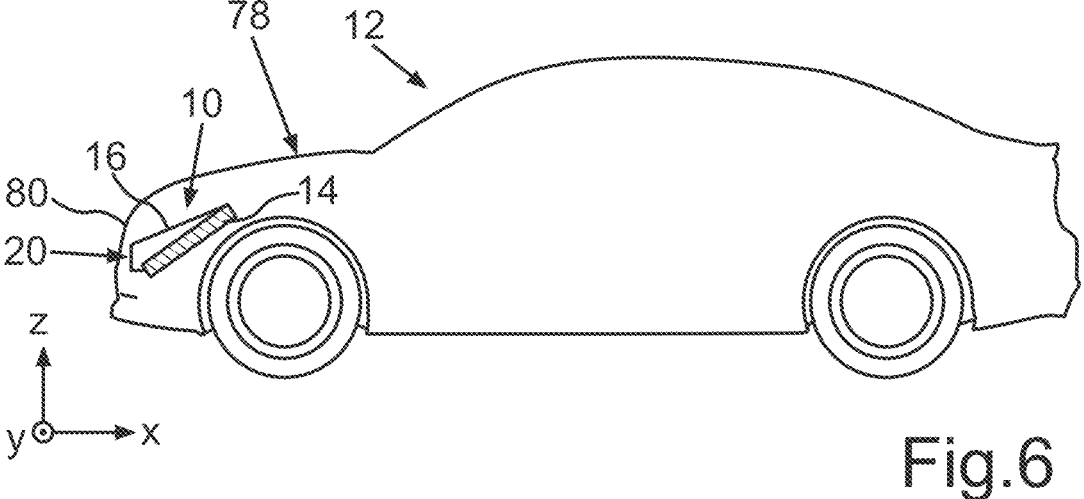
FIG. 6 schematically a vehicle with the radiator arrangement according to FIG. 5.

FIG. 1 shows a radiator arrangement 10 for a vehicle 12, which is very schematically shown in FIG. 6. The radiator arrangement 10 comprises a radiator 14 which can better be seen in a section view of the radiator arrangement 10 shown in FIG. 5 than in FIG. 1.

The radiator arrangement 10 further comprises an air guiding element 16 for guiding an airflow towards the radiator 14. The air guiding element 16 comprises a housing 18 which has an inlet 20 for letting in the airflow and an outlet 22 facing the radiator. The outlet 22 can be better seen from FIG. 5 than from FIG. 1.

In the embodiment shown in FIG. 1 and FIG. 5, the air guiding element 16, in particular the housing 18, is fixed to a holding frame 24 of the radiator arrangement 10, wherein the holding frame 24 holds the radiator 14. In variants of the radiator arrangement 10, the air guiding element 16 and in particular the housing 18 can be directly fixed to the radiator 14.

In both cases or variants, the housing 18 of the air guiding element 16 assures that the airflow entering the air guiding element 16 through the inlet 20 is guided substantially leakage-free towards a front face 26 (see FIG. 5) of the radiator 14.

Further, a cross-sectional area of the outlet 22 corresponds to an area of the front face 26 of the radiator 14. In other words, the size of the cross-sectional area of the outlet 22 is substantially the same as the size of the front face 26 of the radiator 14. Consequently, the air guiding element 16 ensures a very efficient guiding of the airflow towards the front face 26 of the radiator 14 such that the airflow can further pass through the radiator 14. As a result, heat transfer between the air passing through the radiator 14 and a cooling fluid, in particular a cooling liquid, flowing through pipes or conduits of the radiator 14 can take place.

As can be seen particularly well from FIG. 1 and from FIG. 2, the air guiding element 16 comprises a plurality of louvers 28, 30, which are in the embodiment shown in FIG. 1 and FIG. 2 arranged at the inlet 20 of the air guiding element 16. For reasons of simplicity, only some of the louvers 28, 30 are provided with reference signs in FIG. 1 and in FIG. 2.

The louvers 28, 30 are configured and arranged in order to prevent stones of a predetermined size to hit the radiator 14. However, the louvers 28, 30 do not constitute a separate component or part which needs to be fixed to the radiator 14 such as it would be the case for a separate stone protection grill. Rather, by fixing the air guiding element 16 to the radiator 14 or to the holding frame 24, the louvers 28, 30 fulfil their function of providing a stone chip protection for the radiator 14.

Preferably, the louvers 28, 30 are made in one piece with a housing 18 of the air guiding element 16. The housing 18 of the air guiding element 16 can in particular be manufactured by injection molding of plastic. In this injection molding process, the louvers 28, 30 can be readily formed integrally with the other components of the air guiding element 16.

As the louvers 28, 30 are fixed in position relative to the housing 18, the louvers 28, 30 permanently fulfil their function of preventing stones from getting to or hitting the radiator 14. This is the case, even if there is no further stone chip protection element included into the radiator arrangement 10.

As can be seen particularly well from FIG. 2, the louvers 28, 30 are configured as plate like elements having a narrow side or front edge 32 facing the airflow entering the inlet 20. In contrast to that, upper faces 34 and lower faces 36 of the louvers 28, 30 are oriented substantially parallel to the airflow entering the inlet 20 in operation of the radiator arrangement 10.

Due to this preferred shape of the louvers 28, 30 and even though the louvers 28, 30 are immobile, the louvers 28, 30 only cause a very small pressure loss in operation of the radiator arrangement 10. In other words, the shape and arrangement of the louvers 28, 30 impedes the airflow only to a little extent. Consequently, the airflow can reach the front face 26 of the radiator 14 to a particularly large extent without a substantial pressure loss. This is beneficial for a good heat transfer from the cooling fluid, in particular cooling liquid, flowing through pipes or conduits of the radiator 14 in operation of the radiator arrangement 10.

In the embodiment shown in FIG. 1, the louvers 28, 30 extend substantially in a width direction of the inlet 20. In a mounting position of the radiator arrangement 10 in the vehicle 12, this width direction is preferably substantially parallel to a vehicle transverse axis y. In a like manner, in the mounting position a height direction of the inlet 20 preferably extends substantially parallel to a vertical axis z of the vehicle 12. The vehicle transverse axis y, the vehicle vertical axis z and a vehicle longitudinal axis x are illustrated by a respective coordinate system indicated in FIG. 1, in FIG. 5 and in FIG. 6.

Figure 4:
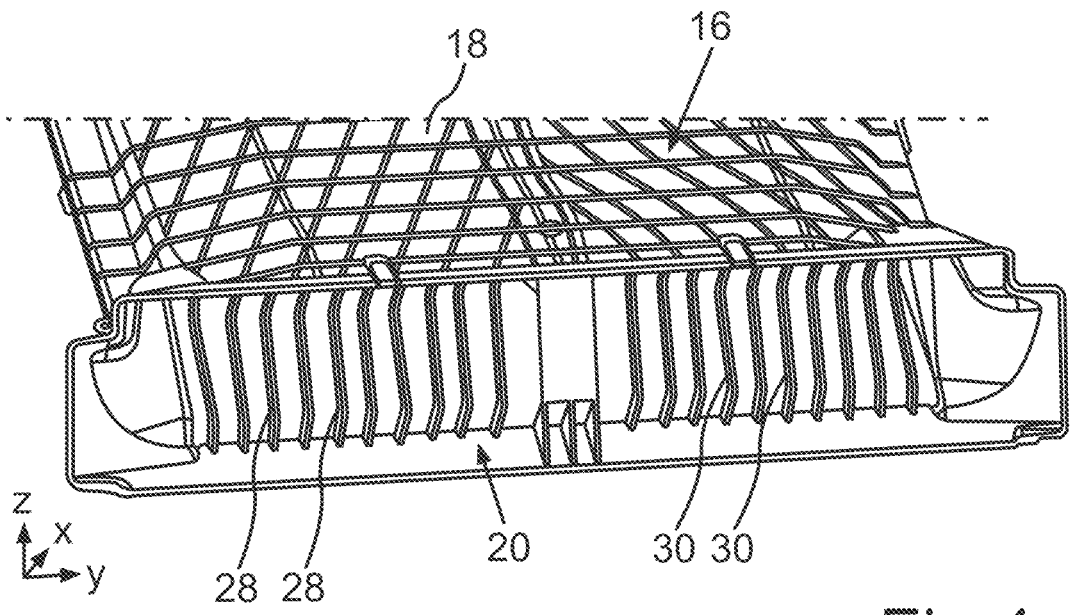
FIG. 4 in a perspective view an alternative air guiding element of the radiator arrangement.

However, as can be seen from FIG. 4, in a variant of the radiator arrangement 10 and in particular of the air guiding element 16, the louvers 28, 30 which prevent stones of a predetermined size from hitting the radiator 14 can extend substantially in the height direction of the inlet 20.

In the embodiment exemplarily shown in FIG. 1, a width of the inlet 20 is larger than a height of the inlet 20. In this embodiment, a center strut 38 is provided. The center strut 38 divides the inlet 20 into a first inlet portion 40 and a second inlet portion 42 (see FIG. 2). In this embodiment, a first group of the louvers 28, 30, for example the louvers 28, are arranged within the first inlet portion 40. And a second group of the louvers 28, 30, for example the louvers 30, are arranged within the second inlet portion 42.

This arrangement goes along with a smaller length of the individual louvers 28, 30 in the width direction of the inlet 20, i.e. substantially parallel to the vehicle transverse axis y. Further, as can be seen from FIG. 1 and FIG. 2, the first group of louvers 28 can comprise stabilizing ribs 44 extending substantially in the height direction of the inlet 20. These stabilizing ribs 44 have end portions 50, 52 abutting a frame element 54 of the inlet. For the sake of clarity, only some of the end portions 50, 52 of the ribs 44 are provided with reference signs in FIG. 1 and FIG. 2.

In a like manner, the louvers 30 arranged within the second inlet portion 42 are also stabilized by stabilizing ribs 56. Here again, only one of the two stabilizing ribs 56 is provided with a reference sign in FIG. 1 and in FIG. 2, respectively for reasons of clarity. In a like manner as described for the stabilizing ribs 44 arranged within the first inlet portion 40, the stabilizing ribs 56 arranged within the second inlet portion 42 each comprise end portions abutting the frame element 54. In the embodiment shown in FIG. 1 and FIG. 2, the stabilizing ribs 44, 56 are made integrally, i.e. in one piece, with the housing 18 of the air guiding element 16, preferably in the injection molding process.

As can be seen particularly well from FIG. 1 and FIG. 5, a cross-sectional area of the inlet 20 is smaller than the cross-sectional area of the outlet 22 of the air guiding element 16. The corresponding flat and broad shape of the inlet 20 is also visible from the front side view of the radiator arrangement 10 shown in FIG. 3.

Figure 3:
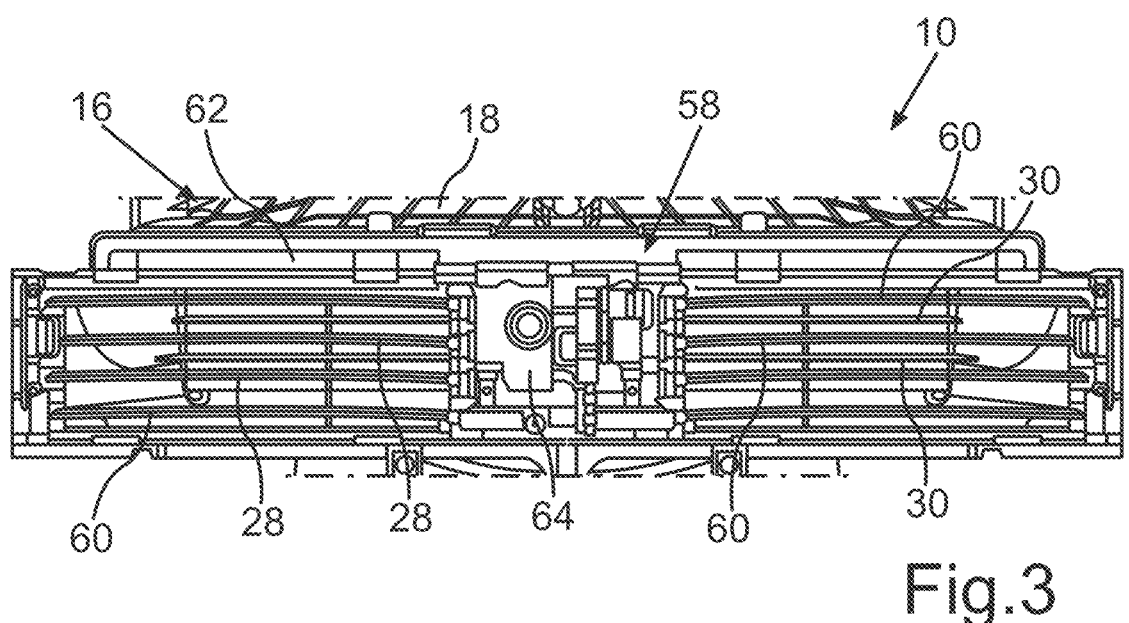
FIG. 3 the radiator arrangement according to FIG. 1, wherein the radiator arrangement comprises a shutter assembly arranged at the inlet of the air guiding element.

In the variant shown in FIG. 3 the radiator arrangement 10 comprises a shutter assembly 58 which is arranged at the air guiding element 16. Specifically, in the embodiment shown in FIG. 3 the shutter assembly 58 is arranged at the inlet 20 of the air guiding element 16, upstream of the immobile louvers 28, 30.

The shutter assembly 58, which is preferably contacting the inlet 20 of the air guiding element 16 in a substantially leakage-free manner, can in particular be fixed to a front-end structure of the vehicle 12. The front-end structure, which can in particular comprise a frame like element holding the shutter assembly 58 in place, is not shown in FIG. 3 for reasons of clarity.

The shutter assembly 58 also comprises a plurality of louvers 60. However, these louvers 60 are not fixed in position or immobile as is the case for the louvers 28, 30 made in one piece with the housing 18. Rather, the louvers 60 of the shutter assembly 58 are movable with respect to a frame structure 62 of the shutter assembly 58. In the embodiment shown in FIG. 3, the frame structure 62 is fixed to the frame element 54 of the air guiding element 16 in order to arrange the shutter assembly 58 at the inlet 20 of the air guiding element 16.

A mechanism 64 for moving the movable louvers 60 into their various positions is schematically shown in FIG. 3. This mechanism 64 can in particular be arranged in front of the center strut 38. Preferably, the mechanism 64 is configured to rotate the blade-like louvers 60 of the shutter assembly 58 in order to influence the amount of air that can enter the inlet 20 and then further be guided to the radiator 14 by means of the housing 18 of the air guiding element 16.

In the embodiment shown in FIG. 3, the movable louvers 60 substantially extend in the same direction as the immobile louvers 28, 30 or louvers 28, 30 fixed in position relative to the housing 18 of the air guiding element 16. However, in particular if the immobile louvers 28, 30 extend substantially in the height direction of the inlet 20 as shown in FIG. 4, the orientation of the immobile louvers 28, 30 can be different from the orientation of the movable louvers 60.

In FIG. 3 the movable louvers 60 are shown moved into an open position allowing a maximum airflow to pass through the shutter assembly 58 and therefore further through the inlet 20 towards the radiator 14. In this orientation of the movable louvers 60, at least some of the louvers 28, 30 fixed in position are in alignment with a space between two adjacent movable louvers 60.

In the height direction of the inlet 20, the fixed or immobile louvers 28, 30 can in particular be arranged between two adjacent movable louvers 60 moved into the open position. Such an arrangement is particularly effective in order to prevent stones from entering the air guiding element. This is due to the fact that the fixed or immobile louvers 28, 30 in cooperation with the movable louvers 60 efficiently prevent the stones from getting into the housing 18 and therefore from hitting the radiator 14.

The arrangement of the fixed louvers 28, 30 and/or the movable louvers 60 can, in particular, be such that at least about 70% of stones having a diameter of 12 mm are prevented from getting to the radiator 14.

As can be seen particularly well from FIG. 1 and FIG. 5, the radiator 14 can be inclined, in particular at an angle of about 45°, with respect to a plane determined by the height direction and the width direction of the inlet 20. Due to this inclination of the radiator 14, a lower edge 66 of the radiator 14 in the height direction is closer to the inlet 20 than an upper edge 68 of the radiator 14. As a consequence of the inclined orientation of the radiator 14, a space 70 is provided above the housing 18 of the air guiding element 16 (see FIG. 5). This space 70 can be advantageously utilized in the vehicle 12, for example for storing items of passengers of the vehicle 12.

FIG. 5 further shows that a further heat exchanger, i.e. another heat exchanger than the radiator 14, can be part of the radiator arrangement 10. For example, the radiator arrangement 10 can comprise a further heat exchanger configured as a condenser 72 of an air conditioning system of the vehicle 12. In the exemplary embodiment shown in FIG. 5, this condenser 72 is arranged downstream of the radiator 14 with respect to the direction of the airflow, when the airflow passes through the radiator 14.

In variants of the radiator arrangement 10 the area of the front face 26 of the radiator 14 can be smaller than the cross-sectional area of the outlet 22. In this case the outlet 22 has a cross-sectional area encompassing the area of the front face 26 of the radiator 14. And the cross-sectional area of the outlet 22 preferably corresponds to an area of a front face of the condenser 72.

FIG. 5 further schematically shows a fan 74 which can be arranged further downstream of the radiator 14 and of the condenser 72. In a manner known as such, blades of the fan 74, which are not shown in detail in FIG. 5, can rotate about a rotation axis 76 of the fan 74 or cooling fan in order to cause the air entering the inlet 20 of the housing 18 to flow through further through the housing 18 and then through the radiator 14.

In FIG. 6 the vehicle 12 having the radiator arrangement 10 is schematically shown in a side view. In FIG. 6 the inclined position of the radiator 14 is illustrated even though the representation of the inclination is not realistic in terms of the actual arrangement of the radiator 14 within the vehicle 12 nor in terms of the actual size of the radiator arrangement 10. However, it can be seen from FIG. 6 that the radiator arrangement 10 is preferably located in a front-end portion 78 of the vehicle 12.

In particular, the inlet 20 of the radiator arrangement 10 can be located or arranged behind a decorative grill 80 of the vehicle 12 which is indicated only schematically in FIG. 6. The air passing through the decorative grill 80 is then further introduced into the inlet 20 of the air guiding element 16 which is part of the radiator arrangement 10. If such a decorative grill 80 is present, the decorative grill 80 further contributes in preventing stones from getting to the front face 26 of the radiator 14. The decorative grill 80 forms in particular part of an external surface of the vehicle 12.

Overall, the examples show how a stone chip protection can be integrated into the air guiding element 16 of the radiator arrangement 10 or such a cooling module of the vehicle 12.

The invention claimed is:

1. A radiator arrangement for a vehicle, comprising:

a radiator and an air guiding element for guiding an airflow towards the radiator, wherein the air guiding element has an inlet for letting in the airflow and an outlet facing the radiator, wherein the air guiding element comprises a plurality of fixed louvers which are configured to prevent stones of a predetermined size to hit the radiator, wherein the fixed louvers are fixed in position relative to a housing of the air guiding element, wherein the housing is configured to guide the airflow towards the outlet, wherein the outlet has a cross-sectional area at least encompassing an area of a front face of the radiator, wherein the front face of the radiator is exposed to the airflow, wherein the radiator arrangement comprises a shutter assembly arranged at the inlet of the air guiding element, wherein the shutter assembly comprises a plurality of movable louvers which are movable with respect to a frame structure of the shutter assembly, wherein, with respect to the airflow, the movable louvers of the shutter assembly are arranged upstream of the fixed louvers, and wherein a mechanism for moving the movable louvers is arranged upstream of the fixed louvers.

2. The radiator arrangement according to claim 1, wherein the fixed louvers are configured as plate like elements having a narrow side facing the airflow and upper and lower faces which are oriented substantially parallel to the airflow.

3. The radiator arrangement according to claim 1, wherein the fixed louvers are made, by injection molding of plastic, in one piece with the housing of the air guiding element.

4. The radiator arrangement according to claim 1, wherein the housing of the air guiding element is fixed in a leakage-free manner to the radiator and/or to a holding frame holding the radiator.

5. The radiator arrangement according to claim 1, wherein the fixed louvers extend in a width direction of the inlet and/or in a height direction of the inlet.

6. The radiator arrangement according to claim 1, wherein the air guiding element comprises a center strut dividing the inlet into a first inlet portion and a second inlet portion, wherein a first group of fixed louvers is arranged within the first inlet portion and a second group of fixed louvers is arranged within the second inlet portion.

7. The radiator arrangement according to claim 6, wherein each of the first group of fixed louvers and the second group of fixed louvers are fixedly coupled to at least one corresponding stabilizing rib extending in a first direction which is different from a second direction in which the louvers of the respective group extend, and wherein the at least one stabilizing rib has end portions abutting a frame element of the inlet.

8. The radiator arrangement according to claim 1, wherein a cross-sectional area of the inlet is smaller than the cross-sectional area of the outlet.

9. The radiator arrangement according to claim 1, wherein the movable louvers of the shutter assembly substantially extend in the same direction as the fixed louvers that are fixed in position relative to the housing of the air guiding element.

10. The radiator arrangement according to claim 1, wherein, when the movable louvers of the shutter assembly are moved into an open position allowing a maximum airflow to pass through the shutter assembly, at least some of the fixed louvers that are fixed in position relative to the housing of the air guiding element are in alignment with a space between two adjacent movable louvers.

11. The radiator arrangement according to claim 1, wherein one or both of the fixed louvers and the movable louvers are configured to prevent stones having a size of at least 15 mm to hit the radiator.

12. The radiator arrangement according to claim 1, wherein the radiator is inclined at an angle of about 45°, with respect to and in fixed relation with a plane determined by a height direction and a width direction of the inlet, and wherein a lower edge of the radiator in the height direction is closer to the inlet than an upper edge of the radiator.

13. A vehicle with a radiator arrangement according to claim 1, wherein the radiator arrangement is located in a front-end portion of the vehicle and behind a decorative grill of the vehicle, and wherein the decorative grill is arranged at the front-end portion of the vehicle.

14. The radiator arrangement according to claim 2, wherein the fixed louvers are made, by injection molding of plastic, in one piece with the housing of the air guiding element.

15. The radiator arrangement according to claim 2, wherein the housing of the air guiding element is fixed in a leakage-free manner to the radiator and/or to a holding frame holding the radiator.

16. The radiator arrangement according to claim 3, wherein the housing of the air guiding element is fixed in a leakage-free manner to the radiator and/or to a holding frame holding the radiator.

17. The radiator arrangement according to claim 2, wherein the fixed louvers extend in a width direction of the inlet and/or in a height direction of the inlet.

18. The radiator arrangement according to claim 3, wherein the fixed louvers extend in a width direction of the inlet and/or in a height direction of the inlet.

19. The radiator arrangement according to claim 6, wherein the mechanism for moving the movable louvers is arranged in front of the center strut.

* * * * *